P. R. CAMPION.
MOTOR TRUCK.
APPLICATION FILED DEC. 11, 1916.
1,284,234.
Patented Nov. 12, 1918.
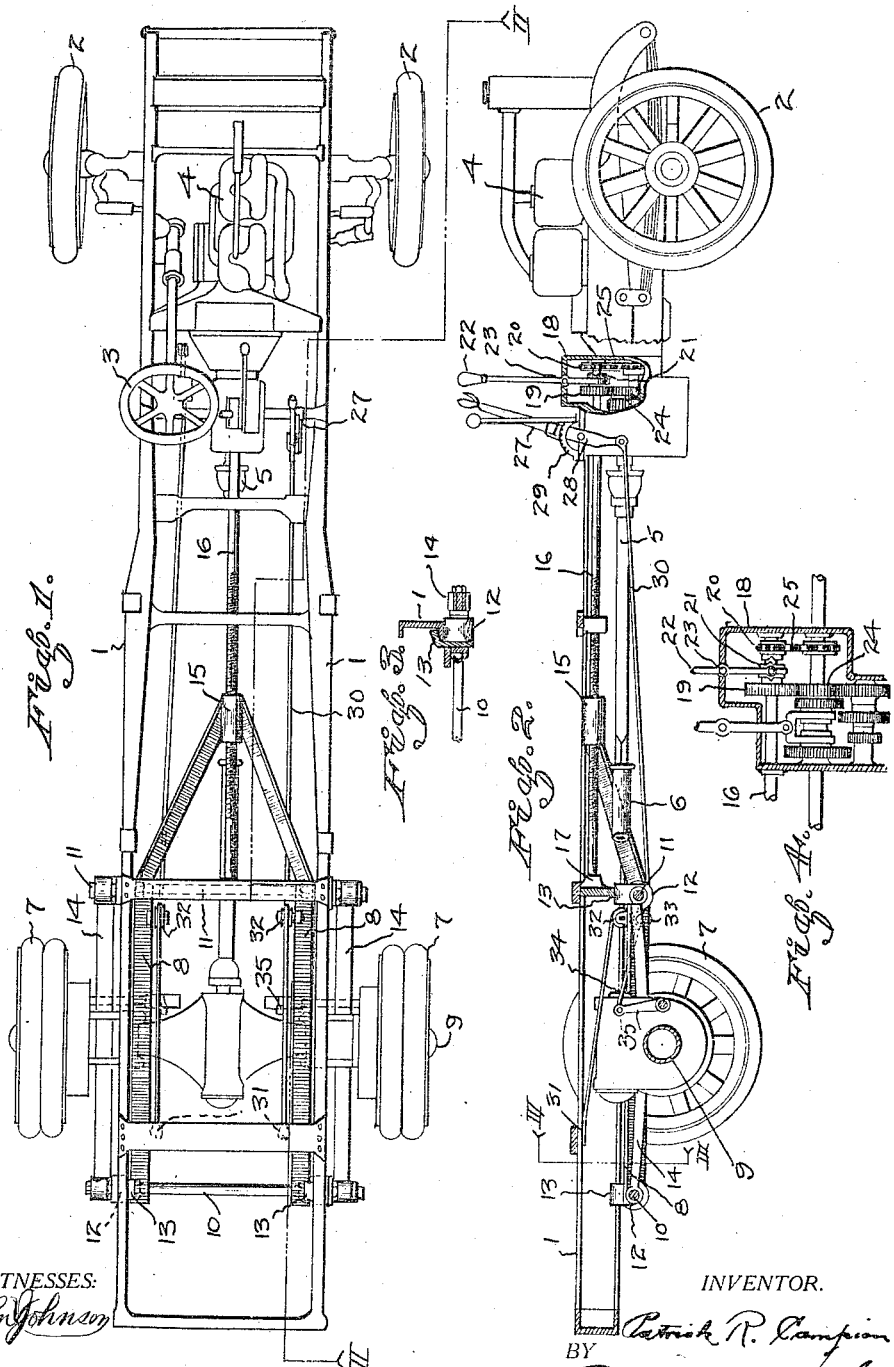
WITNESSES:
Lincoln Johnson
INVENTOR.
Patrick R. Campion
BY
Baldwin Vale
ATTORNEY.

UNITED STATES PATENT OFFICE.

PATRICK R. CAMPION, OF SAN FRANCISCO, CALIFORNIA.

MOTOR-TRUCK.

1,284,234.   Specification of Letters Patent.   Patented Nov. 12, 1918.

Application filed December 11, 1916.   Serial No. 136,134.

*To all whom it may concern:*

Be it known that I, PATRICK R. CAMPION, a citizen of the United States, and a resident of the city and county of San Francisco, State of California, have made a new and useful invention—to wit, Improvements in Motor-Trucks; and I do hereby declare the following to be a full, clear, concise, and exact description of the same.

The invention relates particularly to means for balancing the load with respect to the traction effort and to facilitate extrication of the vehicle when stalled, which are among the objects of this invention.

In this specification and the annexed drawing the invention is illustrated in the form considered to be the best, but it is to be understood that the invention is not limited to such form, because it may be embodied in other forms, and it is also to be understood that in and by the claims following the description it is the desire to cover the invention in whatever form it may be embodied.

In the accompanying sheet of drawing:

Figure 1 is a diagrammatic plan view from above of a motor truck constructed in accordance with this invention.

Fig. 2 is a side elevation of the same, a portion of the gear box being broken away to disclose the interior mechanism for driving the means for varying the wheel base of the motor truck.

Fig. 3 is a fragmentary detail illustrating the connection between the adjustable rear truck and the main frame.

Fig. 4 is a similar view illustrating the driving and reverse gear for controlling the adjustable truck.

In general utility motor trucks the overhang load will vary with certain classes of merchandise making a long wheel base desirable. In other instances a shorter wheel base would be desirable, to accommodate the load to the most efficient tractive position, and to facilitate maneuvering in cramped space. This invention is also valuable in extricating the tractor when stalled, it being possible to advance the tractor by slow degrees by varying the wheel base, as will hereinafter be more fully described.

In detail the construction illustrated in the drawings includes the main frame of the chassis comprising the side sills 1—1, suitably cross braced in accordance with modern practice. The front end of the frame is supported on the steering wheels 2—2, spindled on the front axle and controlled by the steering wheel 3 in the usual manner. The front end of the frame supports the motor 4, that is geared through the usual clutch and transmission gear train to the propeller shaft 5. The power transmitted through the shaft 5 is geared to the rear wheels through a suitable differential gear in the usual manner. To accommodate variations in the wheel base the propeller shaft 5 is provided with a slip joint 6 permitting elongation of the shaft 5.

The traction wheels 7 are mounted upon a sub-frame slidably engaging the main frame 1—1 and hereinafter referred to in its entirety as the traction truck. This traction truck has the side bars 8—8 which can be interposed between the springs and the rear axle 9. These side bars 8 are joined at the rear by the cross bar 10 and in front by a similar bar 11. Anti-friction rollers 12 are interposed between the traction truck and the sills 1—1 of the main frame. These antifriction rollers are mounted upon the cross bars 10 and 11. To prevent disengagement between the traction truck and the main frame, the strips 13 are fixed to the cross bars 10 and 11 and overhang the flange of the side bars 1 to prevent vertical and lateral movement of the traction truck without interfering with its longitudinal adjustment. The usual springs 14—14 are interposed between the cross bars 10—11 and the rear axle. The forward end of the side bars 8—8 are brought forward and joined to the running nut 15 into which the adjusting spindle 16 is threaded. The rear end of the adjusting spindle is stepped into the stud bearing 17 fixed on the main frame. The forward end of the adjusting spindle is carried into the gear box 18 wherein it is provided with the spur gear 19 and the sprocket 20 both freely journaled thereon. The double acting clutch 21, is controlled by the lever 22, pivoted at 23 in the gear box, is feathered on the spindle 16 and adapted to engage either the gear 19 or the sprocket 20, both of which are in constant rotation in opposite directions while the drive shaft is in operation. Engagement with the gear 19 with the gear 24 of the transmission frame rotates the gear 19. in a direction opposite to the direction of rotation of the transmission shaft. The engagement of the sprocket 20 through the sprocket chain 25 with a sprocket fixed on the transmission shaft rotates the sprocket 20 in the same direction as the transmission shaft, whereby the adjusting spindle 16 may be rotated in either direction according to the engagement of the clutch dog 21 which is slidable upon the spindle. Presuming the transmission shaft to be rotating clockwise, as is the usual practice, the engagement of the clutch dog 21 with sprocket 20 will rotate the spindle 16 similarly, the right hand thread engaging the nut 15 to pull the traction truck forward to decrease the wheel base. The engagement of the clutch 21 with the gear 19 has a reverse effect, by which means the traction truck can be moved backward with respect to the chassis.

It often so happens in carrying lumber, rails and such material, that the overhang of the load behind the rear wheels is such that it tends to elevate the front wheels, interfering with the maneuvering of the truck owing to the lack of traction on the front wheels. In a truck having this invention applied thereto, the rear traction truck can be forced backward with the spindle 16 until the load is more nearly balanced and properly distributed. On the other hand, in close quarters with a compact load, it is desirable to have a short wheel base, which can be similarly accomplished by the threaded spindle adjustment previously described. Should a truck become stalled in mud, sand, or other conditions from which it is impossible to extricate it with the normal traction of the hind wheels, the obstruction can be overcome by rotating the spindle 16 to pull the traction truck forward. When the traction truck has reached the desired position the wheel brakes can be applied to hold the traction truck stationary. The power is then applied through the spindle 16 to force the front wheels away from the traction truck and this process is repeated until the obstruction is overcome. This feature alone makes this invention valuable in tractors negotiating mountain roads or unfavorable road conditions. It is obvious that this invention is equally applicable to any form of traction drive at present known in this art, as of the form illustrated or the front wheel drive or a combination of mechanisms driving all four wheels.

The brake control mechanism includes the lever 27 pivoted at 28 on the main frame and controlled by the quadrant 29 in the usual manner. The opposite end of the lever 27 is connected with a flexible cable 30 which has its opposite end fixed to the main frame at 31. This cable is reeved over the pulleys 32 and 33, the pulley 32 being fixedly pivoted on the traction truck. The pulley 33 is journaled in a bracket suspended from the axis of the pulley 32. This bracket is connected by the link 34 to the brake lever 35, pivoted in the housing of the brake drum. The cable 30 passes over the pulley 32 and under the pulley 33 permitting the traction truck to advance or recede without varying the length or adjustment of the cable 30. Pulling the lever 27 backward pulls the forward end of the cable forward which swings the bracket in which the pulley 33 is mounted, which exerts a pull on the link 34 pulling the brake lever forward and contracting the brake band on the brake drum in the usual manner, or expanding the brake within the brake drum if the internal expanding type of brake is used.

What I claim and desire to secure by Letters Patent is:

1. A tractor including a frame mounted on front and rear axles; a motor on said frame; means interposed between said motor and said axles to vary the distance between said axles.

2. A tractor including a frame having a front axle, a tractor truck slidable on said frame; a motor geared to said traction truck; means geared to said motor for sliding said truck on said frame.

3. A tractor including a frame having a front axle; a traction truck slidable on said frame; a motor geared to said traction truck; means geared to said motor for sliding said truck on said frame; and a brake control including a cable having one end fixed to said frame and its opposite end fixed to a lever pivoted on said frame; and passing over a pulley fixed on said traction truck and under a pulley on a bracket swung on the axis of said first named pulley, and a link between said bracket and the brake lever on said traction truck.

4. A tractor including a frame having a front axle; an independent tractor truck unit having a rear axle therein slidable on said frame; a motor on said frame geared to said tractor truck through a slip-joint connection, and means connected to the motor independent of the driving means for varying the distance between the front and rear axles.

5. A tractor including a frame having a front axle; an independent tractor truck unit having a rear axle therein slidable on said frame; a motor on said frame geared to said tractor truck through slip-joint connection, means connected to the motor independent of the driving means for varying the distance between the front and rear axles, and an adjustable brake control connecting the tractor truck and frame.

6. A tractor including a frame having the front axle, engine and transmission mounted thereon; a tractor truck having the rear axle, springs and differential thereon slidable on the frame; a slip joint drive shaft connecting differential and transmission and means geared to said motor and connected to said tractor truck for varying the distance between the front and rear axles.

7. A tractor including a frame having a front axle; a tractor truck having a rear axle therein slidable on said frame; a motor on said frame geared to said traction truck through a slip joint connection and means geared to said motor and connected to said tractor truck for varying the distance between the front and rear axles.

In testimony whereof I have hereunto set my hand at San Francisco, California, this 30th day of November, 1916.

PATRICK R. CAMPION.

In presence of—
BALDWIN VALE,
A. J. HENRY.

Copies of this patent may be obtained for five cents each, by addressing the "Commissioner of Patents, Washington, D. C."